United States Patent [19]

Pike et al.

[11] 3,914,709
[45] Oct. 21, 1975

[54] APPARATUS FOR LENGTHENING LASER OUTPUT PULSE DURATION

[75] Inventors: Charles T. Pike, Lexington; Irving Itzken, Boston, both of Mass.

[73] Assignee: Jersey Nuclear-Avco Isotopes, Inc., Bellevue, Wash.

[22] Filed: May 14, 1973

[21] Appl. No.: 360,178

[52] U.S. Cl. .......................... 331/94.5; 356/106 LR
[51] Int. Cl. ............................................. H01S 3/10
[58] Field of Search ............... 331/94.5; 356/106 LR

[56] References Cited
UNITED STATES PATENTS
3,646,468  2/1972  Buczek et al. ...................... 331/94.5
3,740,664  6/1973  Freiberg et al. .................... 331/94.5

Primary Examiner—William L. Sikes
Attorney, Agent, or Firm—Weingarten, Maxham & Schurgin

[57] ABSTRACT

Apparatus for use with a laser oscillator having a short duration pulse output with high spectral purity for amplifying and lengthening the pulse output without loss of spectral purity. The apparatus typically includes a laser amplifier and means for applying radiation from the laser oscillator to the amplifier and for reapplying a predetermined portion of the amplifier output regeneratively to the amplifier to maintain it in an amplifying condition for a period several times longer than the duration of the original radiation pulse from the laser oscillator. A timing system is provided for synchronizing the application of laser oscillator radiation to the amplifier coincident with excitation of the amplifier to a lasing condition.

25 Claims, 2 Drawing Figures

ND3,914,709

APPARATUS FOR LENGTHENING LASER OUTPUT PULSE DURATION

FIELD OF THE INVENTION

This invention relates to laser amplifiers and in particular to apparatus for amplifying and lengthening the output pulse of a high spectral purity dye laser.

BACKGROUND OF THE INVENTION

The recently developed tunable dye laser permits the generations of spectrally pure laser radiation at very nearly any selected frequency of over a range of frequencies associated with the particular dye, rather than being limited in frequency output to only a few widely separated discrete wavelengths. While such a dye laser may typically have an output pulse duration of only a few nanoseconds, in some applications for a dye laser it may be desirable to have a longer pulse duration. For example, where laser radiation is used to produce atomic or molecular resonant reflections, single frequency of a specific wavelength radiation is typically employed to produce appropriate resonant response. Where a dye laser is employed for this purpose it is advantageous to increase the pulse duration in order to make more energy available in the reflected pulse. Additionally, where the laser radiation is tuned to distinguish specific isotope absorption lines for spectrographic or separation purposes, it is generally advantageous for the laser radiation employed to have a duration longer than the few nanoseconds that are typically associated with the output radiation pulse of the tunable dye laser. It will of course be clear to those skilled in the art that many other applications exist where it would be beneficial to be able to elongate the pulse duration of a laser such as a tunable dye laser, particularly of high spectral purity.

BRIEF SUMMARY OF THE INVENTION

In accordance with the present invention, a system is shown for substantially elongating the duration of laser radiation from a high spectral purity laser tuned to a specific frequency.

In implementing the laser pulse stretching function of the present invention, a tunable dye master oscillator laser is employed having an output frequency corresponding to a predetermined wave length. The laser bandwidth is preferably maintained narrow to provide high spectral purity. To provide a longer photon flux than the output pulse of laser radiation from the dye laser by itself, a pulse stretcher is employed for the oscillator radiation. Radiation from the dye laser oscillation is applied to a laser amplifier which has been pumped, for example, by a flashlamp, to an amplifying condition but not a self-oscillating condition. A plurality of passes of oscillator radiation through the amplifier may be employed to increase the amplification and the resulting amplified output pulse is split into first and second portions. The first portion, having a predetermined, typically relatively small fraction of the output pulse energy, is reapplied to the amplifier for further amplification as regenerative feedback. This regenerative feedback when timed in reapplication to directly follow the previously applied pulse permits continuation of the output pulse for as long as populainversions exist in the amplifying medium. The second portion of the output pulse, typically having the great majority of the laser energy is utilized as radiation for resonant reflection or isotope absorption.

A timer is employed to insure that the dye laser output radiation pulse is generated at an appropriate time in the excitation of the laser amplifier so that self-oscillation of the laser amplifier, which would impair its spectral impurity, is prevented. In addition, frequency selective components in the cavity of the laser amplifier are employed to help maintain spectral purity and narrow bandwidth.

In a further embodiment of the present invention, the laser amplifier may be operated as a ring laser having a delay to time the reinsertion beam with respect to the original radiation from the dye laser. The ring laser configuration provides isolation between the input and the output beams of laser radiation and thereby prevents any output radiation from leaking back into the master oscillator laser.

BRIEF DESCRIPTION OF THE DRAWINGS

These and other features of the present invention will be more clearly understood by reference to the detailed description of the preferred embodiment presented below for purposes of illustration, and not by way of limitation, and to the accompanying drawings of which.

DETAILED DESCRIPTION OF THE PREFERRED EMBODIMENT

Figure 1:
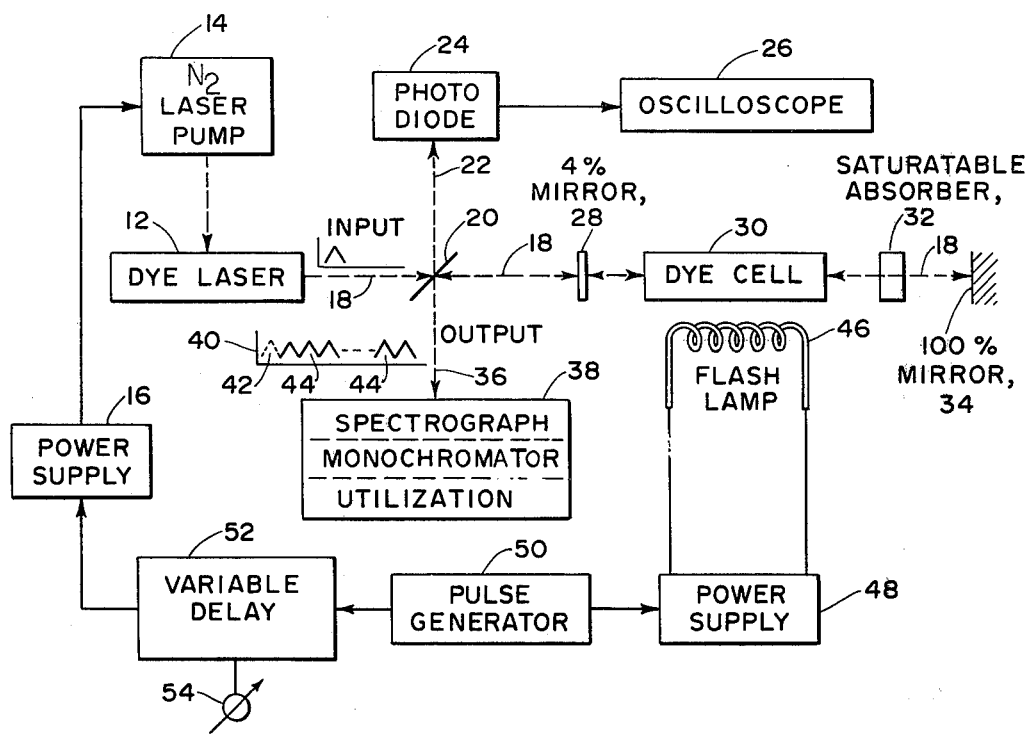
FIG. 1 is a system diagram of a laser pulse stretcher according to the present invention.

By reference now to FIG. 1, a system illustrative of the invention for providing elongation of a laser pulse, typically from a dye laser 12, is shown. The dye laser 12 may be excited by a nitrogen laser, Q-switched ruby laser or other laser pump 14 which is activated from a power supply 16. Laser beam 18 emanates from the dye laser 12, and is applied to a beam splitter 20.

In typical application, the laser beam 18 may be provided by a Dial-A-Line laser of the Avco Everett Research Laboratory, Everett, Mass., and be tuned to a predetermined spectral wavelength for absorption or reflection at a specific resonance point. A standard etalon filter may be employed to limit the bandwidth in the radiation of beam 18. A typical pulse duration for each successive pulse of laser radiation in beam 18 would be in the range of 5 nanoseconds.

The radiant energy in beam 18 is split by the beam splitter 20 into a sampling beam 22, which is applied to a photodiode 24 whose electrical output is applied to an oscilloscope 26 to provide a visible display corresponding to the pulse output of the dye laser 12. The other portion of beam 18, typically comprising the majority of the beam energy, is applied through a lowerpercentage reflectance mirror 28, typically four percent, to a dye cell 30. Radiation in beam 18 passing through the dye cell 30 may optionally be applied to a saturable absorber 32 and then to a 100% reflecting mirror 34. Mirror 34, in conjunction with mirror 28 forms a resonant cavity for the dye cell 30. The saturable absorber 32 is typically of a "hole burning" type. Accordingly, its transmissivity is abruptly increased in a predetermined narrow frequency band when raditation intensity in that band exceeds the absorber's threshold.

The complete circuit length of the cavity between the mirrors 28 and 34 is typically chosen to be approximately 5 nanosecnds, the pulse duration in the beam 18. In this case, the return pulse, after passing twice through the dye cell 30, and thus being twice amplified, will return to the partially reflecting mirror 28 coincident with the trailing edge of the pulse in beam 18. At this point, a portion of the pulse will be reflected by mirror 28 and returned through the dye cell 30 for reflection from mirror 34 and again be returned to the mirror 28. The position of mirror 34 is significant in determining the optical delay of the cavity to produce proper timing of hte feedback pulse. By adjusting the reflectivity of the mirror 28 to be the reciprocal of the gain of the dye cell 30 after two passes of radiation therethrough, substantially the same amplitude pulse may be maintained in each output pulse.

A major portion of the pulse energy, typically 96 percent, will pass through the mirror 28 and be returned to the beam splitter 20 where it is reflected to provide an output pulse 36 applied to a utilization device 38. The device 38 may be a spectrograph, monochromator or other system for such purposes as selective isotope absorption or reflection. The characteristics of the output pulse are shown in a graph 40 wherein the original input pulse from the dye laser 12 is shown as pulse 42 preceding a sequence of pulses 44 representing the additional pulses provided by the dye cell 30.

The pulses 44 will generally continue for as long as the dye cell 30 has amplifying capability. That amplifying capability is defined by the duration of the amplifier excited condition, which in the FIG. 1 embodiment is provided by energy from a flashlamp 46 that is activated by a power supply 48 to apply radiant energy to the dye cell 30 in order to excite its atomic states to a population inversion which permits lasing to take place.

It is desirable to synchronize the pulse 42 in beam 18 from the dye laser 12 with the application of excitation energy from the flashlamp 46 such that the pulse 42 is applied to the amplifying dye cell 30 at the time when it has reached an amplifying condition but before it has achieved a self-oscillatory condition, thereby to limit spectral broadening in the output beam 36. For this purpose a pulse generator 50 provides an electrical signal to the power supply 48 for triggering the excitation burst from flashlamp 46, and also provides an electrical signal through a variable delay 52 to power supply 16 for activating laser pump 14. Delay 52 is adjusted by a control 54 such that its delay permits generation of the pulse 42 in the beam 18 of the oscillator dye laser 12 at the appropriate time for laser amplification in cell 30 without oscillation. This point can be determined by spectrographic or monochromator techniques applied to the output beam 36 as represented by the spectrograph or monochromator 38 in FIG. 1.

The importance of maintaining spectral purity in the elongated pulse results from such applications for the elongated pulse of the present invention which depend upon specific isotope absorption or reflection. Absorption or reflection frequencies may be separated by as little as a fraction of a wave number (an energy measurement corresponding to the number of wavelengths in a centimeter). Accordingly, any spectral broadening or shift which might otherwise occur in laser amplification is preferably avoided. The optional use of the saturable abosrber 32 or other tuning device in the cavity of the dye cell 30 will further inhibit spectral broadening, but the inherent properties of the system of this invention substantially limit spectral broadening.

Figure 2:
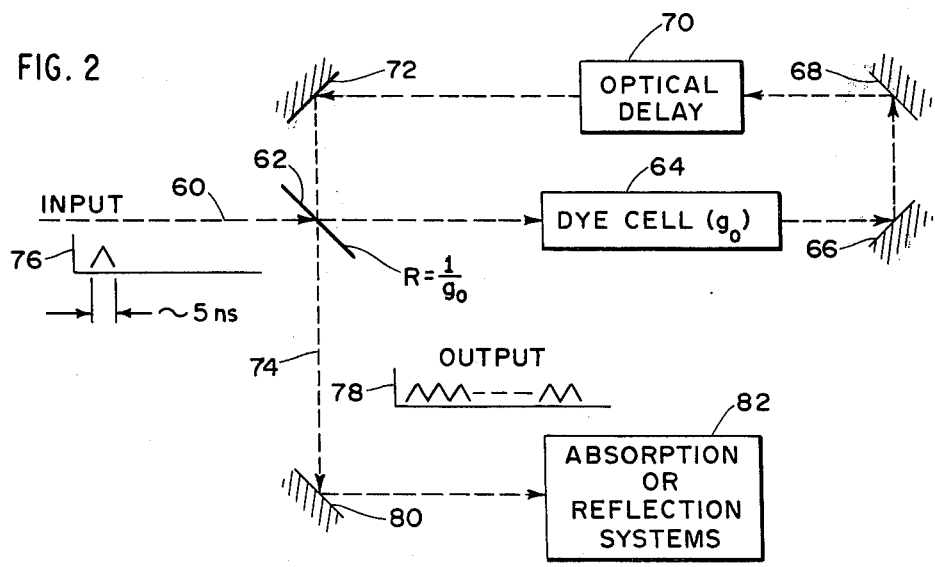
FIG. 2 is a diagram of a modification and alternative to the embodiment of the invention in FIG. 1.

With reference now to FIG. 2, there is shown a modification for the laser pulse elongating system of the present invention which provides an additional feature of separating the output and input pulse angles through the use of a ring laser concept. With reference to FIG. 2, an input beam 60 is applied to a beam splitter 62 and the majority of the laser radiation in the input beam 60, typically from the master oscillator 12 of FIG. 1, passes through beam splitter 62 to a dye cell 64. The dye cell 64 is pumped to an amplifying state using the same or similar excitation and synchronizing electronics of FIG. 1.

The output of the dye cell 64, the amplified input pulse 60, is reflected by first and second 90° fully reflecting mirrors 66 and 68 and applied to an optical delay path 70 having a delay which properly times the reapplied portion of the output pulse. The output of the delay path 70 is applied to a further 90° fully reflecting mirror 72 to apply the delayed beam to the beam splitter 62 on the side opposite from the side of incidence of the input beam 60. The beam splitter 62 will pass a majority of the incident radiation from mirror 72 as an output beam 74 and will reflect a predetermined typically small percentage back to the dye cell 64.

The optical delay path 70 is typically chosen to have a value such that the leading edge of the amplified pulse will arrive at the beam splitter 62 just as the trailing edge of the input pulse in beam 60 has passed through the beam splitter 62. Also, the reflectivity of the beam splitter 62 that determines the portion of light reapplied to the dye cell 64, is preferably chosen equal to the reciprocal of the gain of the dye cell 64. In this case, a single input pulse in the beam 60 as represented by graph 76 will be reproduced as a plurality of generally equal amplitude output pulses as shown in graph 78, representing the output beam 74. The duration of the pulses will be determined by the length of time during which a population inversion in the dye cell 64 can be maintained by the excitation applied to it as from flashlamp 46 in FIG. 1.

A saturable absorber or frequency determining element as shown in FIG. 1 may be used in the FIG. 2 optical ring path. Similarly, the delay element 70 may be either distance or a discrete device in either FIGS. 1 or 2.

Exemplary applications for the laser output beam 74 have been described above for selective isotope absorption or reflection. For this purpose, the beam 74 may be directed by optics 80 into a utilization system 82. For these or other applications, pulse generator 50 may provide a plurality of pulses at a predetermined repetition rate. It is contemplated that many other uses for the elongated radiation pulse of the present invention exist and that the invention is not to be construed as limited to these or any specific exemplary uses.

Having described above a preferred embodiment of the present invention, it will be clear to those skilled in the art that modifications and alternatives to the disclosed apparatus exist within the spirit and scope of the present invention. Accordingly, it is intended to limit the scope of the present invention only as indicated in the following claims.

What is claimed is:

1. A system for lengthening the duration of laser pulse radiation comprising:

means for generating a laser radiation pulse;

a laser radiation pulse amplifier for the generated pulse and including means for exciting the laser amplifier to an amplifying condition;

the generated pulse from said generating means being directed to said laser amplifier to provide amplified laser radiation as the amplified pulse generated from said laser generating means;

means for reapplying a predetermined portion of said amplified laser radiation to said laser amplifier; and means for timing the reapplication of said predetermined portion subsequent to the prior amplified pulse to provide a sequence of amplified laser output radiation pulses.

2. The system for laser pulse duration lengthening of claim 1 further including means for producing the laser radiation pulse from said generating means and the excitation of said laser amplifier in timed relation to provide amplification of the laser output radiation pulse from said generating means before siad laser amplifier reaches a self-lasing condition.

3. The system for laser pulse duration lengthening of claim 2 wherein said producing means includes means repeatedly operative for producing the laser radiation pulse and laser amplifier excitation.

4. The system for laser pulse duration lengthening of claim 1 including:

means for dividing laser radiation incident thereon into separate paths and placed to receive the radiation from said generating means and to direct on a first path radiation to said laser amplifier; and means for providing a radiation path for amplified laser radiation from said laser amplifier to said laser radiation splitting means to provide a portion thereof directed toward said laser amplifier on said first path and a second portion directed on a second path as said sequence of laser output radiation pulses.

5. The system for laser pulse duration lengthening of claim 4 wherein:

said laser amplifier includes a ring configuration radiation path; and said radiation dividing means includes a beam splitter positioned to receive amplified laser radiation of said laser amplifier from the ring configuration path on a first angle and to reflect radiation into said ring configuration path on a second angle;

said beam splitter being operative to pass a portion of the received amplified laser radiation to provide the sequence of output pulses.

6. The system for laser pulse duration lengthening of claim 1 further including:

a beam splitter receiving radiation from said generating means and applying a substantial portion thereof to said laser amplifier and receiving amplified radiation from said laser amplifier and applying a substantial portion thereof to an output path for said sequence of output pulses; and said reapplying means comprising a partially reflecting mirror returning a portion of the amplified laser radiation to said laser amplifier and directing a further portion of the amplified laser radiation to said beam splitter.

7. The system for laser pulse duration lengthening of claim 1 wherein said reapplying means includes means for providing said predetermined portion at an amplitude which maintains a generally constant amplitude for the pulses in said sequence of amplified laser output radiation pulses.

8. The system for laser pulse duration lengthening of claim 7 wherein said predetermined portion is the reciprocal of the net amplification of the amplified laser radiation.

9. The system for laser pulse duration lengthening of claim 1 wherein said timing means includes an optical delay.

10. The system for laser pulse duration lengthening of claim 1 wherein said timing means includes a cavity for said laser amplifier.

11. The system for laser pulse duration lengthening of claim 1 wherein said laser oscillator includes a dye laser.

12. The system for laser pulse duration lengthening of claim 11 wherein said dye laser is tuned for selective absorption by an isotope.

13. The system for laser pulse duration lengthening of claim 1 further including a spectrograph for the sequence of amplified radiation pulses.

14. The system for laser pulse duration lengthening of claim 1 wherein said laser amplifier further includes means for maintaining a narrow bandwidth in the sequence of amplified laser output radation pulses.

15. The system for laser pulse duration lengthening of claim 14 wherein said means for maintaining bandwidth includes a saturable absorber.

16. The system for laser pulse duration lengthening of claim 1 further including means for monitoring the spectral content of said sequence of amplified laser output radiation pulses.

17. A system for lengthening the duration of a laser radiation pulse from a laser oscillator comprising:

a laser oscillator having in an output radiation pulse a predetermined frequency output and substantially narrow spectral range;

a laser radiation amplifier responsive to the output radiation pulse of said laser oscillator to provide an amplified radiatiton output pulse, and including means for exciting the laser amplifier to create an amplifying condition therein for laser radiation;

means for reapplying a portion of the amplified radiation output pulse of said laser amplifier back to said laser radiation amplifier for subsequent amplification thereby; and means for timing the reapplication of said portion to provide amplification of said portion directly subsequent to the provision of each pulse of amplified radiation output from which each said portion is taken.

18. The system for lengthening the duration of a laser radiation pulse of claim 17 wherein said laser radiation amplifier includes a ring laser.

19. The system for lengthening the duration of a laser radiation pulse of claim 18 wherein said reapplying means includes a beam splitter which reflects a portion of said amplified radiation output pulse back to said laser amplifier and passes a portion to provide a sequence of amplified radiation output pulses.

20. The system for lengthening the duration of a laser radiation pulse of claim 17 wherein:

said laser amplifier includes an optical cavity; and said reapplying means includes a partially reflecting mirror in said cavity.

21. The system for lengthening the duration of a laser radiation pulse of claim 17 further including means for energizing said laser oscillator and laser amplifier exciting means in timed relationship to produce amplification of the laser oscillator output radiation pulse generally without loss of spectral purity.

22. A method for lengthening the duration of laser pulse radiation including the steps of:
generating a pulse of laser radiation having a radiation spectral purity sufficient to distinguish between isotope absorption lines for a material;
amplifying said pulse of laser radiation to provide an amplified pulse;
controlling the amplification of said pulse of laser radiation to maintain the spectral purity thereof;
reapplying a portion of the amplified pulse for amplification thereby to provide a sequence of amplified pulses; and
producing output radiation in response to the sequence of amplified pulses, said sequence having a duration substantially longer than said pulse of laser radiation.

23. The method of claim 22 wherein said controlling step further includes the step of causing the amplification of said pulse of laser radiation without self-oscillation.

24. The method of claim 22 wherein said producing step further includes the step of splitting each amplified pulse into said portion for reamplification and into said output radiation.

25. The method of claim 22 wherein said reapplying step includes timing the amplification of each portion to be directly subsequent to the provision of each amplified pulse from which that portion comes.

* * * * *

UNITED STATES PATENT OFFICE
CERTIFICATE OF CORRECTION

PATENT NO. : 3,914,709
DATED : October 21, 1975
INVENTOR(S) : Charles T. Pike and Irving Itzkan It is certified that error appears in the above-identified patent and that said Letters Patent are hereby corrected as shown below:

Column 2, line 8, "impurity" should read --purity--.

Column 3, line 11, "hte" should read --the--.

Column 6, line 40, "radiatiton" should read --radiation--.

Signed and Sealed this twenty-fourth Day of February 1976

[SEAL]

Attest:

RUTH C. MASON
Attesting Officer

C. MARSHALL DANN
Commissioner of Patents and Trademarks